3,264,378
SERINE ESTER OF DIACYL GLYCEROL PHOSPHATE

Joseph P. Dailey, Kankakee, and Robert L. Colescott, Bourbonnais, Ill., assignors to Armour Pharmaceutical Company, Chicago, Ill., a corporation of Delaware
No Drawing. Filed Apr. 9, 1962, Ser. No. 185,856
3 Claims. (Cl. 260—941)

This invention relates to synthetic phospholipids, and more particularly to substituted glycerol phosphatidyl serine having an effect on blood clotting time and on lipid metabolism.

Long chain fatty acid esters of glycerol phosphatidyl serine obtained from brain lipid material have been described as inhibitors of thromboplastin formation during blood coagulation. While this material is physiologically active as a therapeutic agent, several factors have prevented its use. The phospholipid is contained in brain tissue in combination with other lipids that exert an opposite physiological effect. Therefore, extensive purification of the phosphatidyl serine is necessary to free it from these thromboplastic agents. The naturally occurring material contains esters of unsaturated fatty acids and these are susceptible to oxidation. The antithromboplastic activity of the material is destroyed by oxidation. The synthesis of these long chain phospholipids is difficult and expensive.

We have discovered a group of compounds that are chemically related but different from the phosphatidyl serine of natural origin and which are characterized by being relatively short chain phospholipids which are stable, resistant to oxidation, and highly effective as inhibitors of thromboplastic formation during blood coagulation.

A primary object, therefore, is to provide a group of stable synthetic phospholipid compounds having the characteritsics described above. A further object is to provide a process for the preparation of said synthetic phospholipid compounds. Yet another object is to provide a process for prolonging the blood clotting time through the systemic administration of a stable, relatively short chain, synthetic phospholipid compound. Other specific objects and advantages will appear as the specification proceeds.

In one embodiment of our invention, the new group of compounds may be described by the following formula:

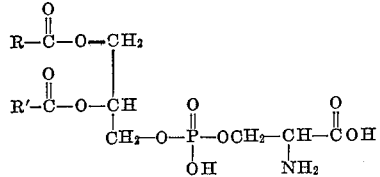

where R may be any radical containing from 1 to 6 carbon atoms and R' may be any radical containing from 1 to 6 carbon atoms, or where the sum of the carbon atoms in R and R' is 12 or less. These alkyl groups may be substituted with any functional groups, such as hydroxyl, halogen, carboxyl, mercapto, amino, etc.

The synthesis of a substituted glycerol phosphatidyl serine may be carried out in any suitable manner. Several routes of synthesis are available, but are complex. We have discovered the following route of synthesis which avoids the complicated procedure and is highly effective in producing an excellent result: Phosphatidyl serine is refluxed in ethyl acetate, p-toluene sulfonic acid, and cyclohexane, and the solvent then removed by evaporation. Acetone is added to the residue and the acetone solvent then evaporated. The residue is then suspended in chloroform and acetone and the precipitate collected. Preferably, the precipitate is collected by filtration, and the filtrate is also evaporated to dryness. Both the precipitate and the filtrate fractions are highly active as antithromboplastic agents.

A specific example may be set out as follows:

Example I

To 200 mg. of phosphatidyl serine of animal origin suspended in 20 ml. of esthyl acetate was added 10 mg. p-toluene sulfonic acid and 100 ml. cyclohexane. The solution was heated at reflux temperature for 24 hours, the solvent removed by evaporation at 40° C. and reduced pressure, and 100 ml. of acetone was added to the residue. This solvent was removed by distillation and the residue was suspended in 10 ml. of chloroform and added to 50 ml. of acetone with stirring. The precipitate was collected by filtration and the filtrate evaporated to dryness. The yield of acetone-chloroform soluble material was 188.5 mg. and the yield of acetone-chloroform insoluble material was 82.5 mg. Both fractions were highly active as antithromboplastic agents in the recalcified plasma coagulation assay.

The product is stable, not susceptible to oxidation, and is highly effective for prolonging the blood clotting time in humans or in animals.

While in the foregoing specification we have set forth a description of the procedure and compounds in considerable detail for the purpose of illustrating the invention, it will be understood that such details may be varied widely by those skilled in the art without departing from the spirit of our invention.

We claim:
1. A serine ester of 1,2-diacyl glycerol 3-phosphate having the formula

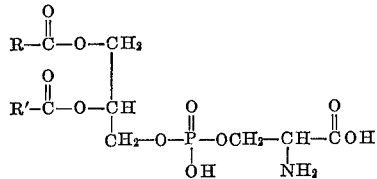

in which R is methyl and R' is methyl.

2. The process of preparing a serine ester of the formula of claim 1 comprising: refluxing phosphatidyl serine with ethyl acetate in the presence of p-toluene sulfonic acid and cyclohexane as a solvent; evaporating the solvent therefrom to leave a first residue; adding acetone to said first residue; evaporating the acetone therefrom to leave a second residue; suspending said second residue in chloroform and acetone; and collecting the precipitate.

3. The process of claim 2 in which the precipitate is collected by filtration and the filtrate is evaporated to dryness.

(References on following page)

References Cited by the Examiner

UNITED STATES PATENTS

| | | | |
|---|---|---|---|
| 2,543,674 | 2/1951 | Swayne | 167—65 |
| 2,864,848 | 12/1958 | McArthur | 260—461 |
| 2,952,699 | 9/1960 | Norman | 260—461 |
| 2,999,049 | 9/1961 | Link | 167—65 |

OTHER REFERENCES

Malkin: Chem. and Ind., vol. 19, May 13, 1961, pp. 605–611.

Dawson: Biochem. J., vol. 84, 1962, pp. 497–501.

Witcoff: "The Phosphatides," Reinhold Publishing Corp., New York, N.Y. (1951), p. 30, 504–522.

Baer et al.: "J. Biol. Chem." (I), vol. 212, pp. 25–38 (1955).

Baer et al.: "J. Am. Chem. Soc.," vol. 81, pp. 2166–2169 (II), 1959.

Deuel: Lipids, vol. I (1951), pp. 5–6.

CHARLES B. PARKER, *Primary Examiner.*

FRANK CACCIAPAGLIA, JR., LEWIS GOTTS,
*Examiners.*

A. P. FAGELSON, F. M. SIKORA, R. L. RAYMOND,
*Assistant Examiners.*